(12) United States Patent
Baldo et al.

(10) Patent No.: US 11,140,751 B2
(45) Date of Patent: Oct. 5, 2021

(54) SYSTEM AND METHOD FOR CONTROLLING QUASI-RESONANT INDUCTION HEATING DEVICES

(71) Applicant: WHIRLPOOL CORPORATION, Benton Harbor, MI (US)

(72) Inventors: Salvatore Baldo, Grotte (IT); Andrea Gallivanoni, Casorate Sempione (IT); Davide Parachini, Cassano Magnago (IT); Cristiano Vito Pastore, Camerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 462 days.

(21) Appl. No.: 15/959,943

(22) Filed: Apr. 23, 2018

(65) Prior Publication Data

US 2019/0327791 A1 Oct. 24, 2019

(51) Int. Cl.
*H05B 6/06* (2006.01)
*H05B 41/28* (2006.01)
(Continued)

(52) U.S. Cl.
CPC .......... *H05B 6/065* (2013.01); *H05B 6/1209* (2013.01); *H02M 7/06* (2013.01)

(58) Field of Classification Search
CPC ...... H05B 6/065; H05B 6/062; H05B 6/1209; H02M 7/06
USPC ............... 219/661, 662, 600, 667, 620, 622, 219/624–627; 363/16, 15, 20, 21, 27, 84, 363/121; 336/84 R, 84 C, 69, 196; 307/91, 104, 150
See application file for complete search history.

(56) References Cited

U.S. PATENT DOCUMENTS

| 3,259,837 A | 7/1966 | Oshry |
| 3,814,888 A | 6/1974 | Bowers et al. |
(Continued)

FOREIGN PATENT DOCUMENTS

| CN | 102396294 A | 3/2012 |
| CN | 103596307 A | 2/2014 |
(Continued)

OTHER PUBLICATIONS

Sarnago et al., "Multiple-Output ZCS Resonant Inverter for Multi-Coil Induction Heating Appliances," IEEE 2017, pp. 2234-2238.
(Continued)

*Primary Examiner* — Quang T Van
(74) *Attorney, Agent, or Firm* — Price Heneveld LLP

(57) ABSTRACT

A control circuit for an induction heating device includes a D.C. power supply, referenced to a ground connection and configured to supply power to the induction heating device. A switching device is configured to be selectively activated to control the induction heating device. The switching device is connected on one end to the ground connection. A resonant load is disposed between the D.C. power supply and the switching device, the resonant load including a capacitor and an inductor connected in a parallel configuration. At least one rectifying device is disposed in series with the resonant load and the switching device. The switching device is configured to control current from the D.C. power supply through the resonant load.

14 Claims, 11 Drawing Sheets

(51) Int. Cl.
*H02J 1/10* (2006.01)
*H05B 6/12* (2006.01)
*H02M 7/06* (2006.01)

(56) References Cited

U.S. PATENT DOCUMENTS

| | | |
|---|---|---|
| 4,029,926 A | 6/1977 | Austin |
| 4,220,839 A | 9/1980 | De Leon |
| 4,356,371 A | 10/1982 | Kiuchi et al. |
| 4,415,788 A | 11/1983 | Field |
| 4,431,892 A | 2/1984 | White |
| 4,438,311 A | 3/1984 | Tazima et al. |
| 4,476,946 A | 10/1984 | Smith |
| 4,540,866 A | 9/1985 | Okuda |
| 4,629,843 A | 12/1986 | Kato et al. |
| 4,695,770 A | 9/1987 | Raets |
| 4,713,528 A | 12/1987 | Hirata |
| 4,776,980 A | 10/1988 | Ruffini |
| 4,810,847 A | 3/1989 | Ito |
| 4,820,891 A | 4/1989 | Tanaka et al. |
| 5,190,026 A | 3/1993 | Doty |
| 5,523,631 A | 6/1996 | Fishman et al. |
| 5,571,438 A | 11/1996 | Izaki et al. |
| 5,640,497 A | 6/1997 | Woolbright |
| 5,665,263 A | 9/1997 | Gaspard |
| 5,686,006 A | 11/1997 | Gaspard |
| 5,808,280 A | 9/1998 | Gaspard |
| 5,866,884 A | 2/1999 | Cornec et al. |
| 6,018,154 A | 1/2000 | Izaki et al. |
| 6,075,715 A * | 6/2000 | Maehara .......... H02M 1/425 363/132 |
| 6,078,033 A | 6/2000 | Bowers et al. |
| 6,230,137 B1 | 5/2001 | Has et al. |
| 6,693,262 B2 | 2/2004 | Gerola et al. |
| 6,696,770 B2 | 2/2004 | Nadot et al. |
| 6,764,277 B2 | 7/2004 | Somahara et al. |
| 7,021,895 B2 | 4/2006 | Rubenstein et al. |
| 7,023,246 B2 | 4/2006 | Scollo et al. |
| 7,049,563 B2 | 5/2006 | Keishima et al. |
| 7,053,678 B2 | 5/2006 | Scollo et al. |
| 7,057,144 B2 | 6/2006 | Hirota et al. |
| 7,274,008 B2 | 9/2007 | Arnal Valero et al. |
| 7,306,429 B2 | 12/2007 | Horng et al. |
| 7,390,994 B2 | 6/2008 | Oh et al. |
| 7,429,021 B2 | 9/2008 | Sather et al. |
| 7,504,607 B2 | 3/2009 | Barragan Perez et al. |
| 7,709,732 B2 | 5/2010 | Phillips |
| 7,759,616 B2 | 7/2010 | Gouardo et al. |
| 7,777,163 B2 | 8/2010 | Hosoi et al. |
| 7,786,414 B2 | 8/2010 | Schilling et al. |
| 7,910,865 B2 | 3/2011 | Haag et al. |
| 7,982,570 B2 | 7/2011 | Burdick, Jr. et al. |
| 8,017,864 B2 | 9/2011 | Phillips |
| 8,248,145 B2 | 8/2012 | Melanson |
| 8,263,916 B2 | 9/2012 | Fujita et al. |
| 8,350,194 B2 | 1/2013 | Lee et al. |
| 8,356,367 B2 | 1/2013 | Flynn |
| 8,431,875 B2 | 4/2013 | Gutierrez |
| 8,440,944 B2 | 5/2013 | Acero Acero et al. |
| 8,558,148 B2 | 10/2013 | Artigas Maestre et al. |
| 8,618,778 B2 | 12/2013 | Gray et al. |
| 8,658,950 B2 | 2/2014 | Cho et al. |
| 8,723,089 B2 | 5/2014 | Sadakata et al. |
| 8,742,299 B2 | 6/2014 | Gouardo et al. |
| 8,754,351 B2 | 6/2014 | England et al. |
| 8,791,398 B2 | 7/2014 | De la Cuerda Ortin et al. |
| 8,817,506 B2 | 8/2014 | Shimomugi et al. |
| 8,853,991 B2 | 10/2014 | Shan et al. |
| 8,878,108 B2 | 11/2014 | Kitaizumi et al. |
| 8,901,466 B2 | 12/2014 | Schilling et al. |
| 8,912,473 B2 | 12/2014 | Roux |
| 8,975,931 B2 | 3/2015 | Koehler |
| 9,006,621 B2 | 4/2015 | Artal Lahoz et al. |
| 9,060,389 B2 | 6/2015 | Lee et al. |
| 9,084,295 B2 | 7/2015 | Sadakata et al. |
| 9,113,502 B2 | 8/2015 | Falcon et al. |
| 9,198,233 B2 | 11/2015 | Brosnan et al. |
| 9,269,133 B2 | 2/2016 | Cho et al. |
| 9,277,598 B2 | 3/2016 | Lee et al. |
| 9,282,593 B2 | 3/2016 | Brosnan et al. |
| 9,326,329 B2 | 4/2016 | Kitaizumi et al. |
| 9,347,672 B2 | 5/2016 | Jungbauer et al. |
| 9,356,383 B2 | 5/2016 | Waffenschmidt et al. |
| 9,370,051 B2 | 6/2016 | Fossati et al. |
| 9,374,851 B2 | 6/2016 | Klein et al. |
| 9,400,115 B2 | 7/2016 | Kuwamura |
| 9,491,809 B2 | 11/2016 | Shaffer et al. |
| 9,554,425 B2 | 1/2017 | Sawada et al. |
| 9,603,202 B2 | 3/2017 | Shaw |
| 9,609,697 B2 | 3/2017 | Aldana Arjol et al. |
| 9,622,296 B2 | 4/2017 | Dehnert et al. |
| 2003/0004647 A1 | 1/2003 | Sinclair |
| 2003/0163326 A1 | 8/2003 | Maase |
| 2004/0173603 A1* | 9/2004 | Kinouchi .......... G03G 15/2042 219/661 |
| 2005/0002784 A1 | 1/2005 | Li et al. |
| 2005/0157522 A1* | 7/2005 | Osaka .............. H02M 3/33569 363/21.02 |
| 2006/0289489 A1 | 12/2006 | Wang |
| 2007/0246458 A1 | 10/2007 | Seok et al. |
| 2009/0020526 A1 | 1/2009 | Roux |
| 2009/0084777 A1 | 4/2009 | Oh et al. |
| 2009/0321424 A1 | 12/2009 | Magdalena et al. |
| 2010/0044367 A1 | 2/2010 | Kim et al. |
| 2010/0052423 A1* | 3/2010 | Shimada .......... H02M 3/33507 307/43 |
| 2010/0163546 A1 | 7/2010 | Nanno et al. |
| 2010/0182136 A1 | 7/2010 | Pryor |
| 2011/0084058 A1 | 4/2011 | Kim et al. |
| 2011/0155200 A1 | 6/2011 | Simka |
| 2011/0240632 A1 | 10/2011 | Falcon et al. |
| 2011/0272397 A1 | 11/2011 | Lahoz et al. |
| 2011/0303653 A1 | 12/2011 | Chun et al. |
| 2012/0024835 A1 | 2/2012 | Artal Lahoz et al. |
| 2012/0024842 A1 | 2/2012 | Thomann et al. |
| 2012/0223070 A1 | 9/2012 | Matsui et al. |
| 2012/0248098 A1 | 10/2012 | Lee et al. |
| 2012/0261405 A1 | 10/2012 | Kurose et al. |
| 2012/0321762 A1 | 12/2012 | Aranda Vazquez et al. |
| 2013/0334210 A1 | 12/2013 | Takehira et al. |
| 2014/0305928 A1 | 10/2014 | Thompson et al. |
| 2015/0245417 A1 | 8/2015 | Fattorini et al. |
| 2015/0341990 A1 | 11/2015 | Nagata et al. |
| 2016/0037584 A1 | 2/2016 | Viroli et al. |
| 2016/0037589 A1 | 2/2016 | Altamura et al. |
| 2016/0135255 A1 | 5/2016 | Ogawa et al. |
| 2016/0234889 A1 | 8/2016 | Vazquez et al. |
| 2016/0330799 A1 | 11/2016 | Leyh et al. |
| 2016/0381735 A1 | 12/2016 | Christiansen et al. |
| 2016/0381736 A1 | 12/2016 | Christiansen et al. |
| 2017/0055318 A1 | 2/2017 | Franco Gutierrez et al. |
| 2017/0105251 A1 | 4/2017 | Viroli et al. |
| 2017/0142783 A1 | 5/2017 | Herzog et al. |
| 2017/0181229 A1 | 6/2017 | Lomp et al. |

FOREIGN PATENT DOCUMENTS

| | | |
|---|---|---|
| CN | 204538995 U | 8/2015 |
| DE | 7242625 U | 3/1973 |
| DE | 3909125 A1 | 9/1990 |
| DE | 4228076 C1 | 8/1993 |
| DE | 19907596 A1 | 8/2000 |
| DE | 102004009606 A1 | 9/2005 |
| DE | 102007032757 A1 | 2/2008 |
| DE | 102007037881 A1 | 1/2009 |
| DE | 202009000990 U1 | 4/2009 |
| DE | 102010028549 A1 | 11/2010 |
| DE | 112008002807 B4 | 9/2013 |
| DE | 102013206340 A1 | 10/2014 |
| DE | 102014105161 A1 | 10/2015 |
| DE | 102015220788 A1 | 6/2016 |
| DE | 102015220795 A1 | 6/2016 |
| EP | 0498735 A1 | 8/1992 |
| EP | 0722261 A1 | 12/1995 |

(56) References Cited

FOREIGN PATENT DOCUMENTS

| | | |
|---|---|---|
| EP | 0713350 A1 | 5/1996 |
| EP | 1137324 A1 | 9/2001 |
| EP | 1629698 B1 | 5/2003 |
| EP | 1505350 A2 | 2/2005 |
| EP | 1610590 A1 | 12/2005 |
| EP | 0926926 B1 | 11/2006 |
| EP | 1455452 B1 | 9/2007 |
| EP | 2095686 B1 | 11/2007 |
| EP | 2352359 B1 | 1/2009 |
| EP | 2252130 B1 | 3/2009 |
| EP | 2070442 A2 | 6/2009 |
| EP | 1575336 B1 | 1/2010 |
| EP | 2642820 A1 | 11/2010 |
| EP | 2120508 B1 | 12/2010 |
| EP | 2506662 A1 | 10/2012 |
| EP | 2506674 A1 | 10/2012 |
| EP | 2615376 A1 | 7/2013 |
| EP | 2048914 B1 | 10/2013 |
| EP | 2744299 A1 | 6/2014 |
| EP | 2775785 A1 | 9/2014 |
| EP | 2211591 B2 | 10/2014 |
| EP | 1931177 B1 | 5/2015 |
| EP | 2034799 B1 | 5/2015 |
| EP | 2034800 B1 | 5/2015 |
| EP | 2204072 B1 | 7/2015 |
| EP | 2731402 B1 | 8/2015 |
| EP | 2975289 A2 | 1/2016 |
| EP | 1303168 B1 | 3/2016 |
| EP | 2445309 B1 | 5/2016 |
| EP | 2525485 B1 | 7/2016 |
| EP | 2543232 B1 | 7/2016 |
| EP | 2838316 B1 | 10/2016 |
| EP | 2427032 B1 | 12/2016 |
| EP | 2914059 B1 | 12/2016 |
| EP | 3170363 A1 | 5/2017 |
| EP | 3042541 B1 | 6/2017 |
| EP | 2416621 B1 | 7/2017 |
| EP | 3030042 B1 | 8/2017 |
| EP | 3139702 A1 | 8/2017 |
| EP | 3079443 B1 | 11/2017 |
| ES | 2201937 A1 | 3/2004 |
| ES | 2310962 A1 | 1/2009 |
| ES | 2328540 B1 | 9/2010 |
| ES | 2340900 B1 | 5/2011 |
| ES | 2362523 B1 | 8/2012 |
| FR | 2659725 A1 | 9/1991 |
| FR | 2712071 A1 | 5/1995 |
| FR | 2863039 A1 | 6/2005 |
| FR | 2965446 A1 | 3/2012 |
| GB | 2048025 B | 1/1983 |
| JP | H07211443 A | 8/1995 |
| JP | H07211444 A | 8/1995 |
| JP | H08187168 A | 7/1996 |
| JP | 2001196156 A | 7/2001 |
| JP | 3225240 B2 | 11/2001 |
| JP | 2008153046 A | 7/2008 |
| JP | 2009117378 A | 5/2009 |
| JP | 2009158225 A | 7/2009 |
| JP | 4932548 B2 | 5/2012 |
| KR | 20170019888 A | 2/2017 |
| WO | 9737515 A1 | 10/1997 |
| WO | 2005069688 A2 | 7/2005 |
| WO | 2008031714 A1 | 3/2008 |
| WO | 2008122495 A1 | 10/2008 |
| WO | 2009016124 A1 | 2/2009 |
| WO | 2009049989 A1 | 4/2009 |
| WO | 2009053279 A1 | 4/2009 |
| WO | 2010101135 A1 | 9/2010 |
| WO | 2011128799 A1 | 10/2011 |
| WO | 2011148289 A2 | 12/2011 |
| WO | 2012104327 A1 | 8/2012 |
| WO | 2014090872 A1 | 6/2014 |
| WO | 2014156010 A1 | 10/2014 |
| WO | 2016010492 A1 | 1/2016 |
| WO | 2016015971 A1 | 2/2016 |
| WO | 2016071803 A1 | 5/2016 |
| WO | 2016087297 A1 | 6/2016 |
| WO | 2016134779 A1 | 9/2016 |
| WO | 2017109609 A1 | 6/2017 |
| WO | 2017115334 A1 | 7/2017 |

OTHER PUBLICATIONS

Sarnago et al., "Modulation Scheme for Improved Operation of an RB-IGBT-Based Resonant Inverter Applied to Domestic Induction Heating," IEEE Transactions on Industrial Electronics, vol. 60, No. 5, May 2013, pp. 2066-2073.

* cited by examiner

US 11,140,751 B2

SYSTEM AND METHOD FOR CONTROLLING QUASI-RESONANT INDUCTION HEATING DEVICES

TECHNOLOGICAL FIELD

The present disclosure relates to an induction cooktop and, more specifically, to an induction cooktop assembly comprising a plurality of cooking zones.

BACKGROUND

Induction cooktops are devices which exploit the phenomenon of induction heating for food cooking purposes. The disclosure provides for a variety of improved assemblies for induction cooktops that may improve performance and/or economical manufacture. Such improvements may serve to improve the utilization of induction-based cooking technologies. Accordingly, the disclosure provides for assemblies, systems, and methods for induction cooktops.

SUMMARY

In at least one aspect, a control circuit for an induction heating device is disclosed. The control circuit comprises a D.C. power supply, referenced to a ground connection and configured to supply power to the induction heating device. A switching device is configured to be selectively activated to control the induction heating device. The switching device is connected on one end to the ground connection. A resonant load is disposed between the D.C. power supply and the switching device, the resonant load comprises a capacitor and an inductor connected in a parallel configuration. At least one rectifying device is disposed in series with the resonant load and the switching device. The switching device is configured to control current from the D.C. power supply through the resonant load.

In at least another aspect, a method for controlling an induction heating device is disclosed. The method comprises supplying current from a D.C. power supply into an input node of a resonant load and emitting the current from an output node of the resonant load. The method further comprises directionally conducting the current in a unidirectional path from the output node of the resonant load to a switching node downstream along the unidirectional path from the output node. The method further comprises controlling a current conducted through the resonant load with a switching device.

In at least another aspect, a control circuit for an induction heating coil is disclosed. The control circuit comprises a D.C. power supply. The D.C. power supply is referenced to a ground connection and configured to supply power to the induction heating device. The control circuit further comprises a switching device configured to be selectively activated supplying driving current to the induction heating coil. The switching device is connected on one end to the ground connection. A resonant load is disposed between the D.C. power supply and the switching device. The resonant load comprises a capacitor and the induction heating coil connected in parallel. A rectifying device is disposed in series between the D.C. Power supply and the switching device.

These and other features, advantages, and objects of the present device will be further understood and appreciated by those skilled in the art upon studying the following specification, claims, and appended drawings.

DETAILED DESCRIPTION OF EMBODIMENTS

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Conventional induction cooktops may comprise a top surface made of glass-ceramic material upon which cooking units are positioned (hereinafter "cooking utensils"). Induction cooktops operate by generating an electromagnetic field in a cooking region on the top surface. The electromagnetic field is generated by inductors comprising coils of copper wire, which are driven by an oscillating current. The electromagnetic field has the main effect of inducing a parasitic current inside a pan positioned in the cooking region. In order to efficiently heat in response to the electromagnetic field, the cooking utensils may be made of an electrically conductive ferromagnetic material. The parasitic current circulating in the cooking utensil produces heat by Joule effect dissipation; such heat is generated only within the cooking utensil and acts without directly heating the cooktop.

Induction cooktops have a better efficiency than conventional electric resistive element cooktops. For example, heating cookware via induction provides for a greater fraction of the absorbed electric power to be converted into heat that heats the cooking utensil. In operation, the presence of the cooking utensil on the cooktop causes the magnetic flux to be directed into the pan itself resulting in power being transferred to the pan. The disclosure provides for assembly arrangements and methods for improved manufacturing and performance of induction cooktops. In particular, the disclosure provides for control circuit arrangements for cooktops comprising a plurality of induction coils.

Figure 1A:
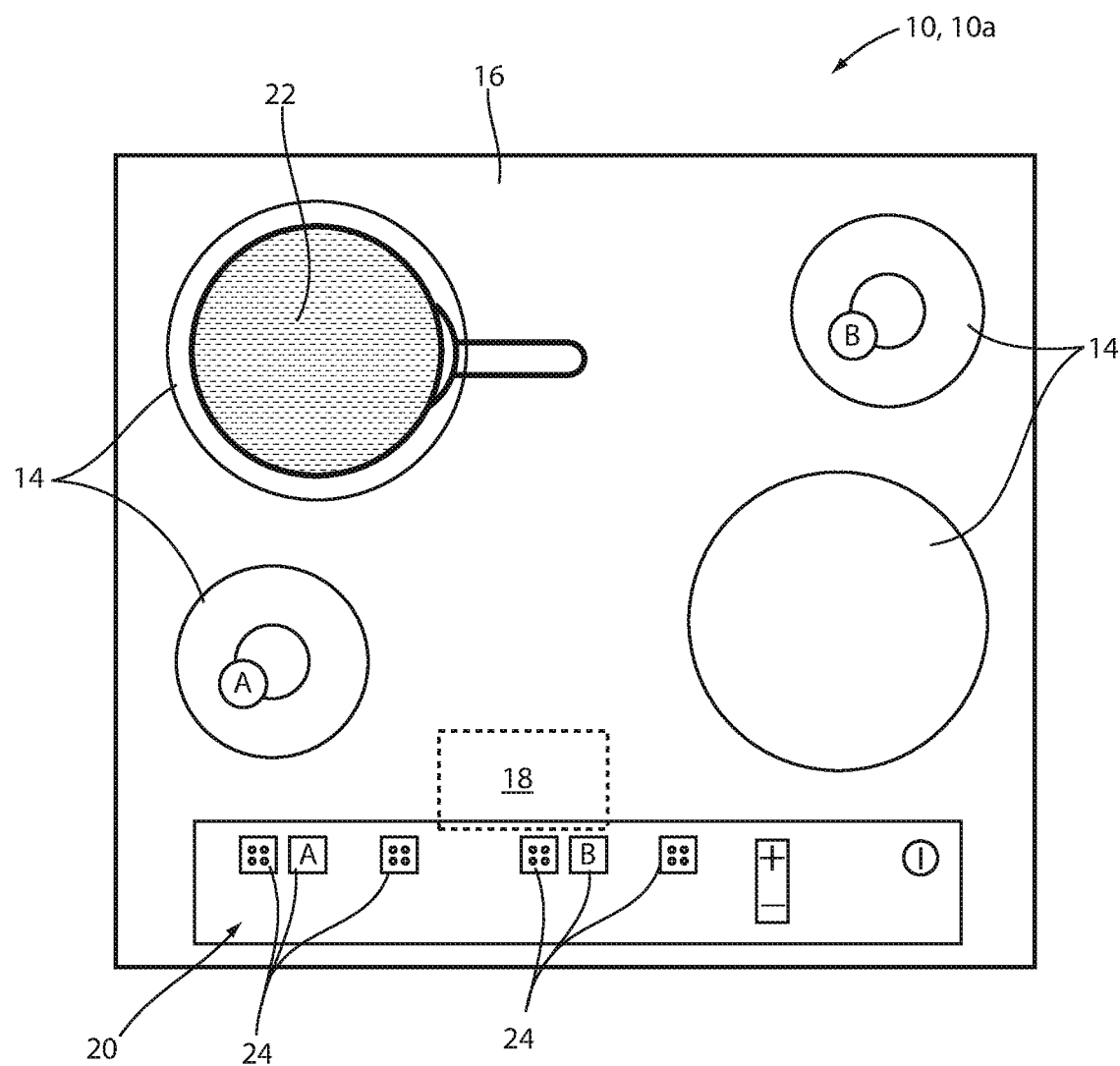
FIG. 1A is a top, plan view of an induction cooktop assembly comprising a plurality of induction coils.
Figure 1B:
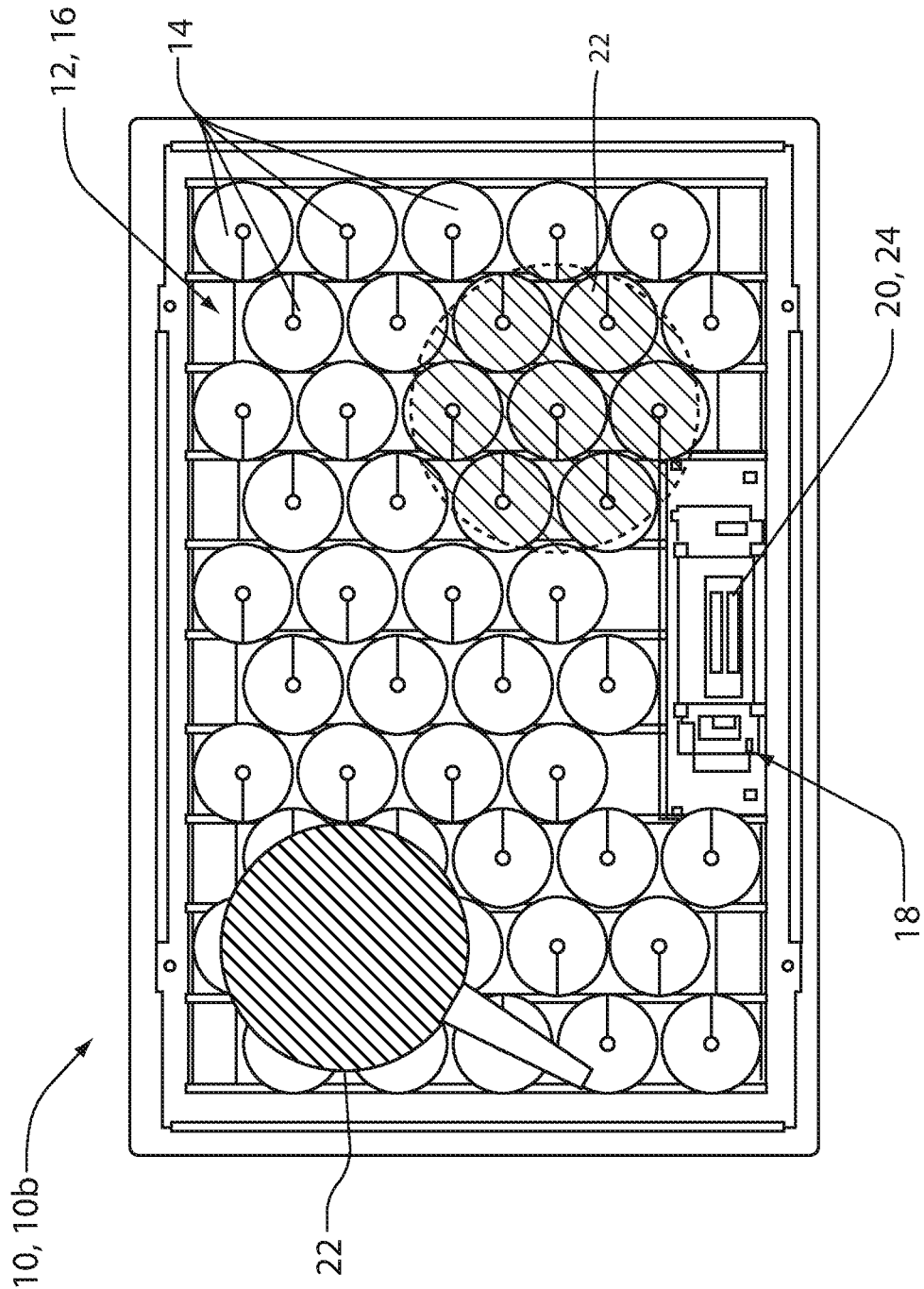
FIG. 1B is a top, plan view of an induction cooktop assembly comprising a matrix of induction coils.

Referring to FIGS. 1A and 1B, exemplary induction cooktop assemblies 10 are shown. A first induction cooktop assembly 10a may comprise a plurality of induction coils 14 forming cooking zones on a cooking surface 16. A second induction cooktop assembly 10b comprises a matrix 12 or array of induction coils 14 distributed over the cooking surface 16. In each of the embodiments 10a, 10b, and various similar or combined configurations, the induction coils 14 may be in communication with a controller 18. The controller 18 may be configured to selectively activate the induction coils 14 in response to an input to a user interface 20. The controller 18 may correspond to a control system configured to activate one or more cooking regions formed by the induction coils 14 in response to an input or user selection.

As later discussed in detailed reference to various exemplary embodiments, the induction coils 14 may be supplied current via one or more control circuits in communication with the controller 18. The control circuits may comprise switching devices that may be configured to generate a variable frequency/variable amplitude current to feed the induction coils 14. The switching devices implemented in various embodiments of the disclosure may comprise a variety of switching technologies and configurations. For example, in some embodiments, the switching devices may comprise one or more power semiconductor devices. The power semiconductor devices may comprise one or more transistors, thyristors, metal-oxide-semiconductor-field-effect-transistors (MOSFETs), power MOSFETs, insulated gate bipolar transistors (IGBTs), switch controlled rectifiers (SCRs), etc. Accordingly, the disclosure may provide for the induction coils 14 to be driven by a variety of control circuits to heat a cooking utensil 22 (e.g. pans, pots, etc.).

In some embodiments, the induction coils 14 may be independently activated by the controller 18. The activation of the induction coils 14 may be in response to a user-defined heat setting received via the user interface 20 in conjunction with a detection of a cooking utensil 22 on the cooking surface 16. In response to the user-defined setting and the detection of the cooking utensil 22, the controller 18 may activate the induction coils 14 that are covered by the cooking utensil 22. Accordingly, the cooktop assembly 10 may provide for the cooking surface 16 to be selectively energized providing for a plurality of flexible cooking zones that may be referred to as a "cook anywhere" functionality.

The user interface 20 may correspond to a touch interface configured to perform heat control and selection induction coils 14 for a cooking operation. The user interface 20 may comprise a plurality of sensors configured to detect a presence of an object (e.g. a finger of an operator) proximate thereto. The sensors of the user interface 20 may correspond to various forms of sensors. For example, the sensors of the user interface 20 may correspond to capacitive, resistive, and/or optical sensors. In some embodiments, the user interface 20 may further comprise a display 24 configured to communicate at least one function of the cooktop assembly 10. The display 24 may correspond to various forms of displays, for example, a light emitting diode (LED) display, a liquid crystal display (LCD), etc. In some embodiments, the display 24 may correspond to a segmented display configured to depict one or more alpha-numeric characters to communicate a cooking function of the cooktop 10. The display 24 may further be operable to communicate one or more error messages or status messages from the controller 18.

Figure 2:
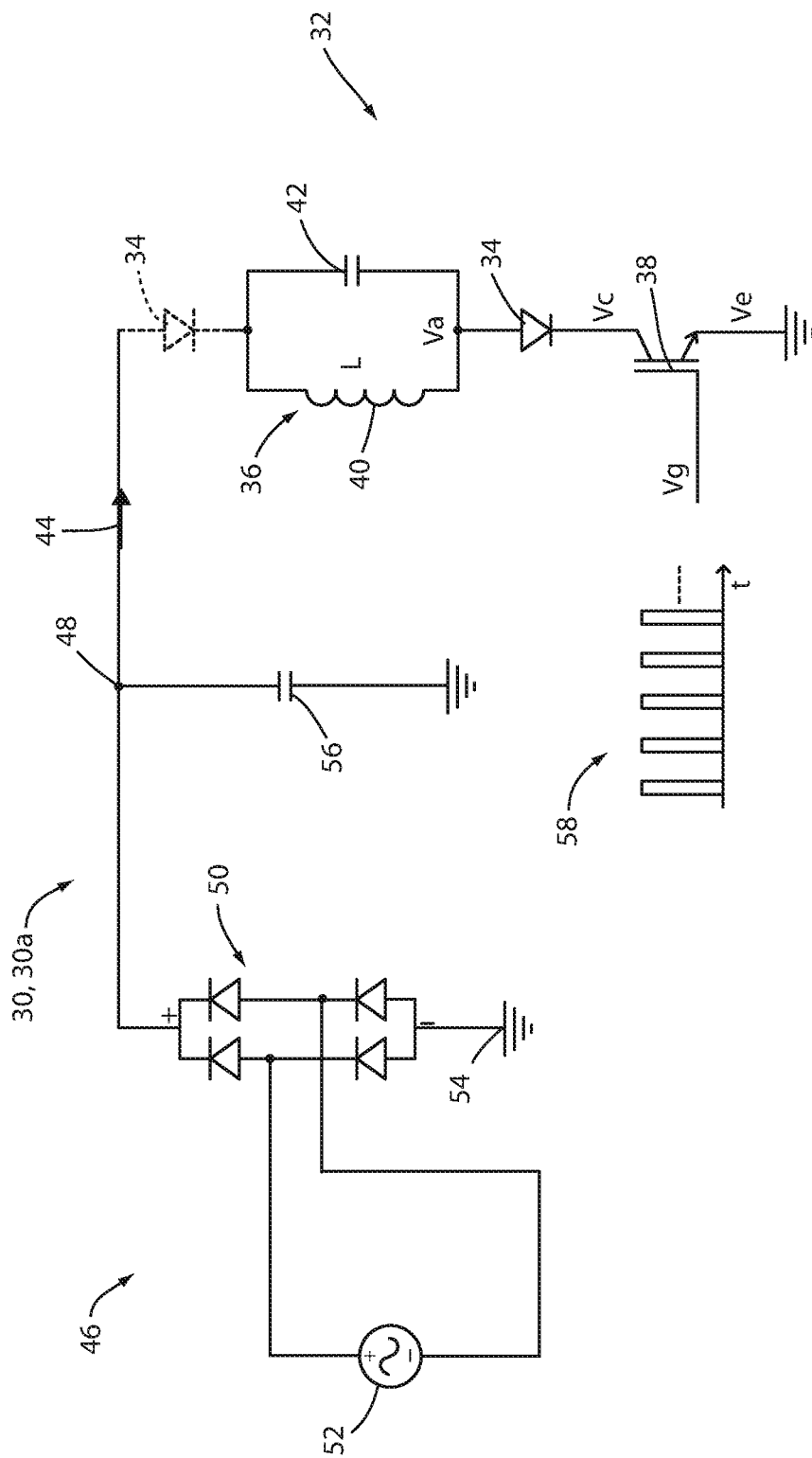
FIG. 2 is a circuit diagram demonstrating a control circuit for a single, non-under-clamped quasi-resonant inverter.

Referring now to FIG. 2, in some embodiments, a control circuit 30 of for the induction cooktop assembly 10 may be implemented using a novel configuration. For clarity, the control circuit 30 shown in FIG. 2 is referred to as the first control circuit 30a. The first control circuit 30a may be implemented as a variant of a quasi-resonant inverter. The variant of the quasi-resonant inverter shown in FIG. 2 is referred to as a Non-Under-Clamped, Quasi-Resonant (hereinafter referred to as NUC-QR) Inverter 32. The NUC-QR inverter 32 comprises a rectifying device 34 connected in series with a resonant load 36 and a switching device 38. As shown in FIG. 2, the rectifying device 34 is interposed along the path between a D.C. power supply 46, a resonant load 36, and a switching device 38.

The rectifying device 34 may be implemented as a semiconductor diode. Semiconductor diodes may include, but are not limited to, junction diodes, Silicon Diodes, Silicon Carbide Diodes, Schottky diodes, etc. In some embodiments, the control circuits and corresponding components may be referred to using specific identifiers (e.g. first, second, third, etc.). The specific identifiers may be used for clarity to distinguish among the exemplary embodiments of the control circuits 30 demonstrated in the figures. However, such designations shall not be considered limiting to the scope of the disclosed configurations provided herein. Accordingly, the control circuits 30 and underlying components may be combined or implemented in combination without departing from the spirit of the disclosure.

The resonant load 36 may be formed by an inductor 40 representing one of the induction coils 14 and a capacitor 42, connected in series with the rectifying device 34. Though demonstrated with the rectifying device 34 located downstream along a current path 44, in some embodiments, the rectifying device 34 may be located upstream of the resonant load 36, between the resonant load 36 and a direct current (D.C.) power supply 46. A representation of the rectifying device 34 positioned upstream of the resonant load 36 is shown in phantom lines. In operation, the function of the rectifying device 34 is to prevent any return current to a D.C. bus 48 when the resonant voltage (Va, Vc) is less than zero. The D.C. power supply 46 may comprise a voltage rectifier 50, configured to rectify a mains input voltage 52 into direct current and output the D.C. voltage to the D.C. bus 48 and a ground connection 54. Additionally, the rectifier 50 may comprise a D.C. bus capacitor 56, which may be configured to smooth the voltage of the D.C. bus 48.

The arrangement of the rectifying device 34 arranged in series with the switching device 38 (e.g. an IGBT), may be referred to as a reverse blocking configuration. In operation, the rectifying device 34 is configured to prevent return current traveling upstream opposite to the current path 44 normally flowing from the D.C. bus 48 to the resonant load 36. Accordingly, a duration of a resonant phase of the NUC-QR inverter 32 is extended, leading to an improved regulation range. Additional benefits of the operation of the NUC-QR inverter 32 may include decreased electromagnetic interference (EMI) and improved operating efficiency when compared to conventional inverter topologies. In this configuration, the controller 18 may be configured to control the switching device 38 via a control signal 58 to generate an electromagnetic field to inductively heat the cooking utensil 22 over an increased operating range.

Figure 3A:
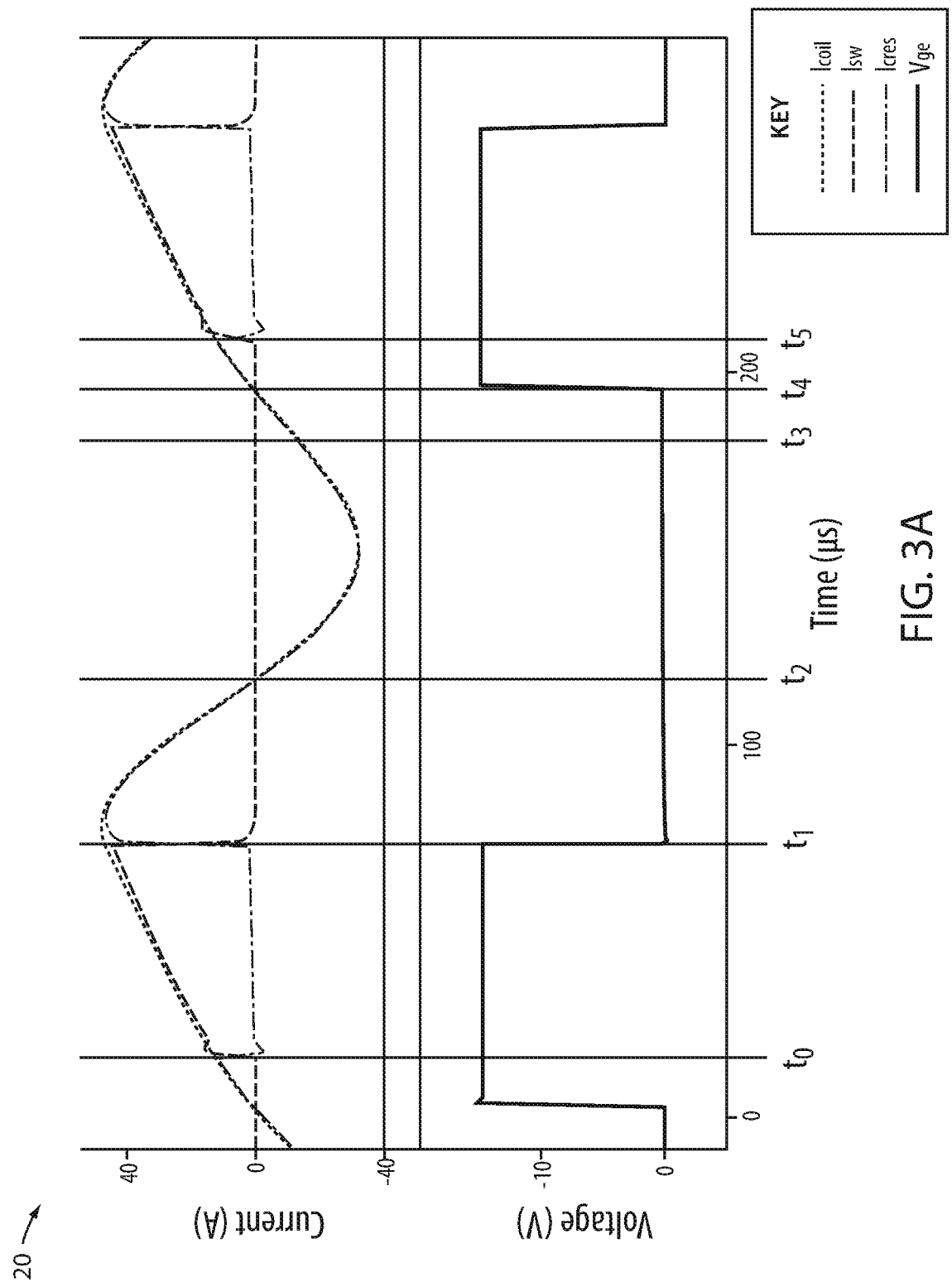
FIG. 3A demonstrates simulated results for a system response of the control circuit shown in FIG. 2 over a time interval.
Figure 3B:
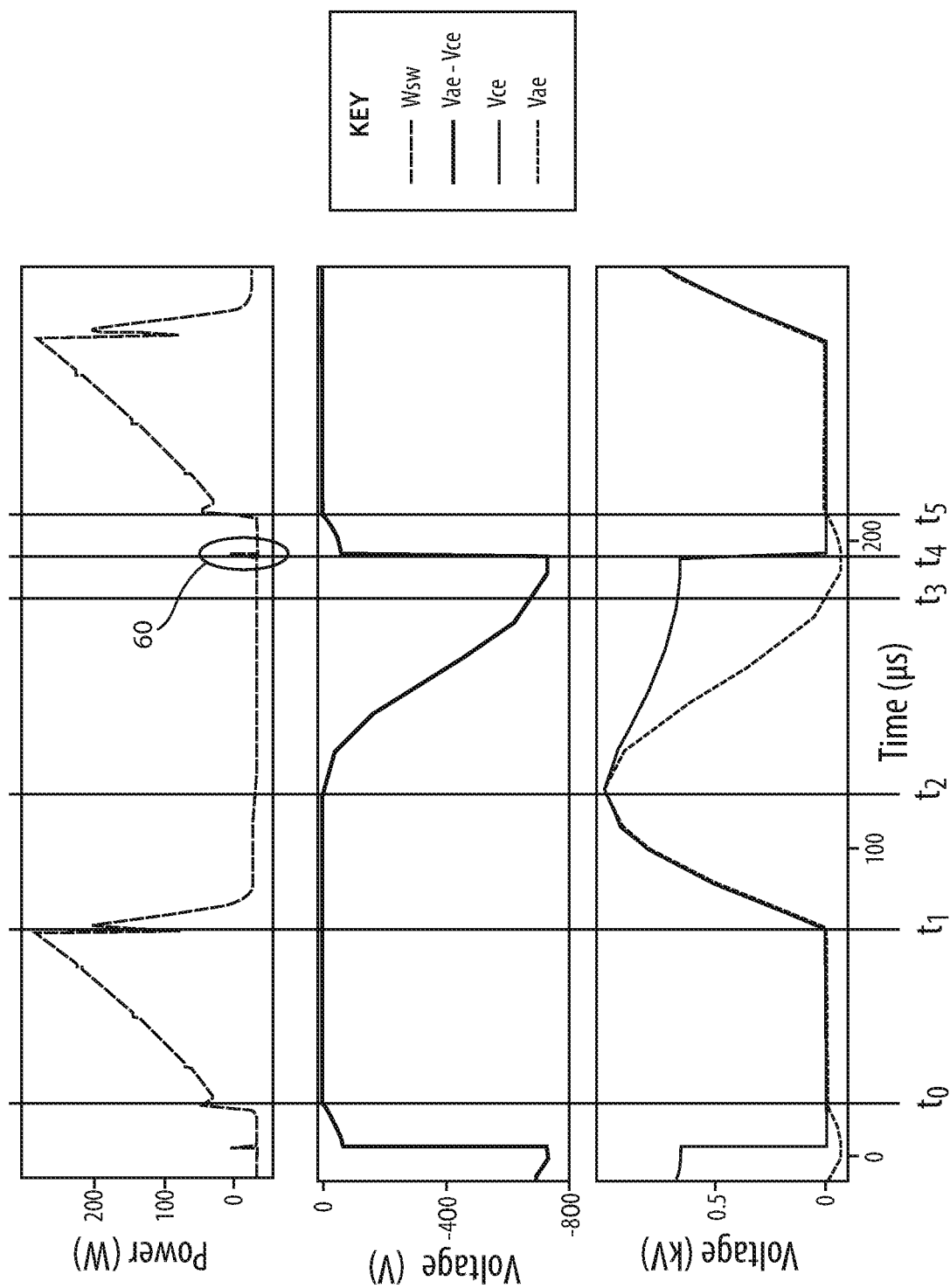
FIG. 3B demonstrates simulated results for a system response of the control circuit shown in FIG. 2 over a time interval.

FIGS. 3A and 3B demonstrate simulated results of the system response of the first control circuit 30$a$. Referring to FIGS. 2, 3A, and 3B, the component types utilized for the simulation shown in FIGS. 3A and 3B are as follows: switching device 38 (IGBT—APT25GF100BN), rectifying device 34 (Diode—STTH3010D), capacitor 42 (270 nF), and inductor 40 (80uH with a series resistor of 4Ω). As represented in FIG. 3A, the waveforms of the NUC-QR inverter 32 include gate voltage $V_{ge}$ applied to the gate of the switching device 38, the current $I_{cres}$ through the capacitor 42, $I_{SW}$ through the switching device 38, and the current $I_{coil}$ through the inductor 40. The waveforms demonstrated in FIG. 3B demonstrate the voltage difference $V_{ce}$ across the switching device 38 between the cathode voltage $V_c$ and the emitter voltage $V_e$. FIG. 3B additionally demonstrates the voltage difference $V_{ae}$ across the rectifying device 34 and the switching device 38 between the anode voltage $V_a$ and the emitter voltage $V_e$ and the difference between the $V_{ce}$ and $V_{ae}$. Finally, FIG. 3B demonstrates the power loss $W_{SW}$ of the switching device 38.

The waveforms demonstrated in FIGS. 3A and 3B are demonstrated over a plurality of time intervals $t_0$, $t_1$, $t_2$, $t_3$, $t_4$, and $t_5$. From time intervals $t_0$ to $t_1$, a gate voltage $V_{ge}$ or command voltage of the switching device 38 is high. Accordingly, both the switching device 38 and the rectifying device 34 are ON and the currents $I_{SW}$ through the switching device 38 and the current $I_{coil}$ through the inductor 40 are the same. Additionally, the voltages $V_{ce}$ and $V_{ae}$ are approximately zero. The phase denoted from $t_0$ to $t_1$ is called a charging phase of the inductor 40. At the time $t=t_1$, the switching device 38 is turned OFF by the controller 18. Following the charging phase, the free evolution phase or resonant phase begins and persists until the time $t=t_5$.

In the resonant phase from times $t_1$ to $t_2$, the capacitor 42 and the inductor 40 begin to resonate, exchanging energy. At the time $t=t_2$, the voltages $V_{ce}$ and $V_{ae}$ are maximum. At this stage, the voltages $V_{ce}$ and $V_{ae}$ must not exceed a voltage limit or breakdown voltage of the switching device 38. From times $t_2$ to $t_3$, the free evolution of the resonant group continues, and a negative voltage across the rectifying device 34 begins to grow. At the time $t=t_3$, the voltage $V_{ae}$ becomes negative and the rectifying device 34 remains reverse polarized. The rectifying device 34 remains reverse polarized until the time $t=t_5$, when $V_{ae}$ becomes zero.

The operational phase associated with the proposed first control circuit 30$a$ occurring from times $t_3$ to $t_5$ does not occur in conventional configurations that have previously been implemented. Indeed, in conventional inverters, an anti-parallel diode is typically used to limit the negative voltage difference $V_{ce}$ to zero across the switching device 38 between the cathode voltage $V_c$ and the emitter voltage $V_e$. In contrast, and according to the present disclosure, the NUC-QR inverter 32 of the first control circuit 30$a$ does not clamp the voltage $V_{ce}$, allowing the voltage $V_{ae}$ to vary freely to negative values. During the phase from times $t_3$ to $t_5$, there is no current flow in the switching device 38 because the rectifying device 34 is reverse polarized.

The reverse polarization of the rectifying device 34 is caused by a negative voltage at the anode of the rectifying device 34 (i.e. node $V_a$). Between the time instants $t_3$ and $t_5$, the current passing through the inductor 40 ($I_{coil}$) is supplied by the capacitor 42. Therefore, there are no losses in the switching device 38, which results in an improved operating efficiency in comparison to conventional inverter arrangements. Finally, at the time $t=t_5$, the voltage across the rectifying device 34 ($V_{ae}-V_{ce}$) crosses zero. At this time, the switching device 38 begins to close the path for the current passing through the inductor 40 ($I_{coil}$).

The beneficial configuration of the first control circuit 30$a$ and the NUC-QR inverter 32 enables an increased timing range for the activation of the switching device 38 while maintaining soft-switching operation. For example, during the phase from times $t_3$ to $t_5$, the switching device 38 may be controlled to turn ON (e.g. at $t=t_4$) without incurring in hard-switching losses. The soft-switching range is substantially extended because the commutation at high voltage levels $V_{ce}$ across the switching device 38 does not involve the discharge of the large resonant capacitor as required by conventional systems. Instead, only a relatively small parasitic capacitance is associated with the switching operation of the switching device. The power loss associated with the parasitic capacitance is shown in FIG. 3B as a power loss 60 at the output of the switching device 38. Accordingly, the operation of the first control circuit 30$a$ comprising the NUC-QR inverter 32 provides for improved efficiency by limiting loss associated with controlling the switching device 38 and also extending the operating range the inverter while maintaining soft-switching operation.

Another important aspect of the present disclosure, particularly when the switching device is embodied as for instance an IGBT, is the widening of the power delivery curve as a function of the IGBT ON time, with an increase in the maximum power being delivered to the induction coil 14 for a given maximum resonant voltage at the IGBT collector. This increase in maximum power is due to the use of a larger fraction of the energy stored in the capacitor 42 in the resonant load 36 during the phase $t_3$-$t_5$, where the $V_{ae}$ is negative. In fact, in the conventional quasi-resonant inverter, this phase is blocked by the anti-parallel diode of the IGBT.

The particular arrangement of the first control circuit 30$a$ and the NUC-QR inverter 32 may be implemented in a variety of ways to provide for the improved operation of various devices for induction cooking and heating. The following discussion provides for similar novel configurations of control circuits 30 that may incorporate the operation of similar circuit configurations to achieve similar benefits to those discussed in reference to the first control circuit 30$a$. Accordingly, the following exemplary embodiments of control circuits may be implemented alone or in combination in various applications to provide for improved performance for induction heating and cooking. Additionally, common or similar elements of each of the control circuits 30 may be referred to by like reference numerals for clarity.

Figure 4:
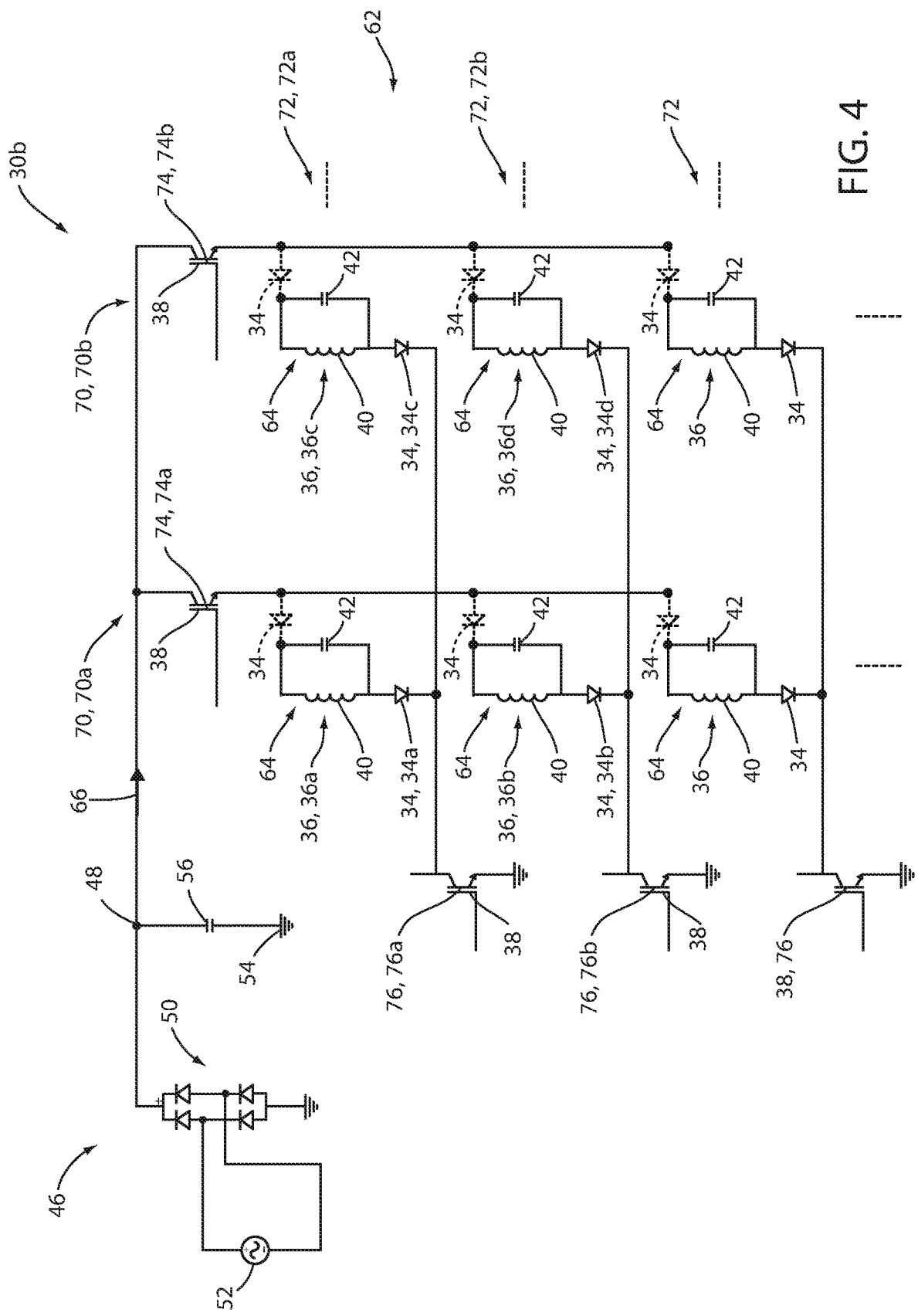
FIG. 4 is a circuit diagram demonstrating a control circuit for a matrix of non-under-clamped quasi-resonant inverters.

Referring now to FIG. 4, a circuit diagram is shown demonstrating a second control circuit 30$b$ for a matrix 62 of inverters 64. The matrix 62 may comprise M rows 72 and N columns 70, where M=3 and N=2 in the representation are shown in FIG. 4. Similar to the first control circuit 30$a$, the second control circuit 30$b$ may implement a matrix configuration of the NUC-QR inverter 32. Accordingly, each of the inverters 64 forming the matrix 62 may be implemented as the NUC-QR inverter 32. As previously discussed, each of the NUC-QR inverters 32 may comprise a rectifying device 34 arranged in series with the resonant load 36 and a switching device 38. More generally, each of the rectifying devices 34 may be connected in series, upstream or downstream to the resonant loads 36, along the resonant load current path 66. As illustrated in the exemplary embodiment, each of the resonant loads 36 may be formed by the inductor 40 and the capacitor 42 arranged in parallel and connected upstream along the current path 66 relative to the rectifying device 34.

As shown in FIG. 4, the inductors 40 representing the induction coils 14 are arranged in columns 70 and rows 72. Each of the columns 70 is connected to the D.C. bus 48 via a column-switching device 74. For clarity, the column switching devices 74 of each of the columns 70 may be referred to as a first column switching device 74a, a second column switching device 74b, etc. Additionally, each of the rows 72 is connected to a control input from the controller 18 via a row-switching device 76. The row switching devices 76 of each of the rows 72 may be referred to as a first row switching device 76a, a second row switching device 76b, etc. The row-switching devices 76 are further in connection with the ground connection 54 of the voltage rectifier 50. In this configuration, the controller 18 may selectively activate each of the inductors 40 to activate flexible heating zones on the surface 16 of the cooktop 10. Though the terms rows 72 and columns 70 are discussed in reference to each of the embodiments, it shall be understood that the arrangement of the rows 72 and columns 70 may be transposed without departing from the spirit of the disclosure.

The second control circuit 30b may limit the specific combinations of inductors 40 that can be energized by the controller 18 at a given time. In an exemplary embodiment, the induction coils 14 represented by the inductors 40 may be rated to supply an average power of up to 500 W and a peak power preferably comprised between 3 and 6 times the average power. Accordingly, each of the inductors 40 may operate with a maximum Duty Cycle equal to the ratio between the average power and the peak power, wherein the ratio ranges from approximately 1:3 to 1:6. In this way, the controller 18 may be configured to energize a limited number of coils at any given time. This operation inherently results in an increased probability that an overlapping operating frequency range can be achieved for multiple induction coils 14 operating simultaneously on one or more of the rows 72 or columns 70, resulting in the possibility of the induction coils 14 to operate at the same identical frequency.

The presence of the rectifying device 34 provides for the second control circuit 30b to prevent current from passing among the resonant loads 36. Still referring to FIG. 4, a first column 70a of the second control circuit 30b comprises a first resonant load 36a connected in series with a first rectifying device 34a and a second resonant load 36b connected in series with a second rectifying device 34b. Each of the first resonant load 36a and the second resonant load 36b are connected to a first column 70a. The first resonant load 36a is further connected to a first row 72a, and the second resonant load 36b is further connected to a second row 72b.

The second control circuit 30b further comprises a third resonant load 36c connected in series with a third rectifying device 34c and a fourth resonant load 36d connected in series with a fourth rectifying device 34d. Each of the third resonant load 36c and the fourth resonant load 36d are connected to a second column 70b. The third resonant load 36c is further connected to the first row 72a, and the second resonant load 36b is further connected to the second row 72b. As shown in FIG. 4, the rectifying devices 34 may prevent current from passing among each of the resonant loads 36. Though specific numbers are referenced to identify specific elements shown in the figures, such reference numerals shall not be considered limited to the disclosure.

Figure 5:
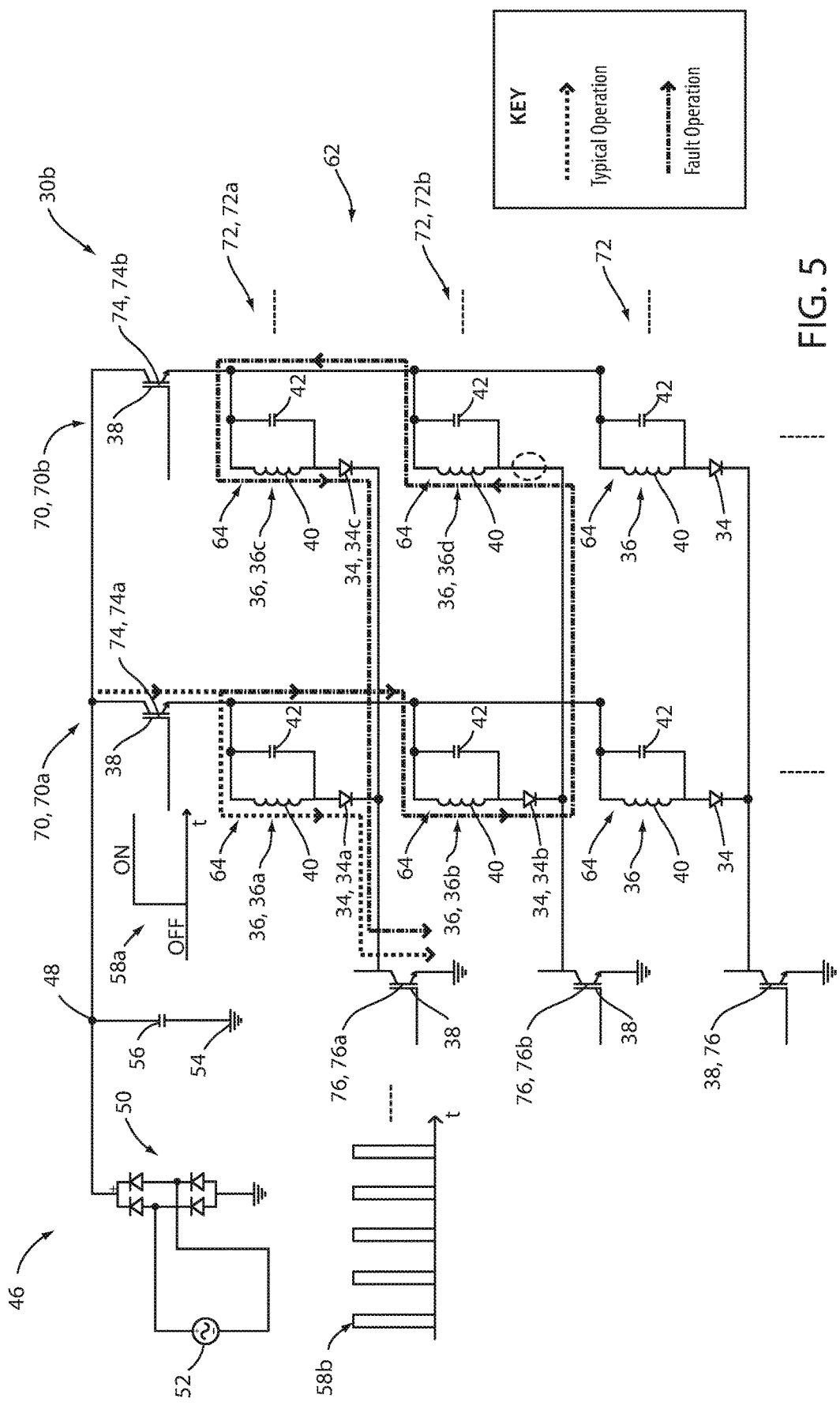
FIG. 5 is a circuit diagram modified from the circuit shown in FIG. 4 demonstrating a current path within the matrix resulting from an omitted rectifying device.

In FIG. 5 is illustrated an example of the second control circuit 30b in which one of the rectifying devices 34 is omitted. As referred to in FIG. 5, the fourth rectifying device 34d of the diagram shown in FIG. 4, is omitted. During typical operation, as illustrated by the corresponding dashed line in the Key for FIG. 5, the controller 18 may activate the first resonant load 36a by activating each of a first column-switching device 74a and a first row-switching device 76a. The switching devices 38 are shown activated in response to a first signal 58a and a second signal 58b transmitted from the controller 18. Accordingly, as shown, the current may flow from the D.C. bus 48, through the first column-switching device 74a, through the first resonant load 36a, the first row switching device 76a, and to the ground connection 54.

The operation of the second resonant load 36b is hereafter discussed in reference to FIG. 5, in which the fourth rectifying device 34d is omitted. As illustrated in FIG. 5 by the corresponding dashed line in the Key for fault operation, the omission of the fourth rectifying device 34d may result in the current passing through the second resonant load 36b and traveling along the second row 72b toward the fourth resonant load 36d. The current may further be conducted from the fourth resonant load 36d upstream along the second column 70b and through the third resonant load 36c. As derivable from the above description, the rectifying devices 34 may prevent current from traveling outward from one resonant load 36 and into another thereby preventing an unwanted working condition, wherein resonant loads 36b, 36d, and 36c are activated in addition to the only desired resonant load 36a. Additionally, the utilization of the rectifying devices 34 renders not necessary the use of switching devices with anti-parallel diodes (e.g. reverse conducting IGBTs) such that simpler and less expensive switching devices may be utilized to construct the second control circuit 30b.

Referring again to FIG. 4, each of the switching devices 38 of the second control circuit 30b may be in communication with the controller 18. In this configuration, the controller 18 may be operable to coordinate the staggered activation of each resonant load 36 within the matrix 62. In such embodiments, the controller 18 may be configured to monitor one or more electrical characteristics of each induction coil 14. The controller 18 may monitor characteristics, such as current or voltage supplied to each of the induction coils 14 via one or more feedback inputs of the controller 18, which may correspond to analog or digital inputs. The characteristics of each of the induction coils 14 monitored by the controller 18 may include a complex impedance vs. frequency or the power vs. frequency curve. Based on the feedback information from the induction coils 14, the controller 18 may compute an activation sequence of predetermined duration $T_{prog}$. The activation sequence may comprise a sequence consisting of $N_{prog}$ time slices of duration $T_s$, wherein the control variables (period, duty cycle) of the switching devices are kept substantially constant. As discussed herein, each of the control circuits 30 may comprise a controller or control circuit configured to control the one or more associated switching devices. Further details regarding an exemplary embodiment of the controller 18 are discussed in reference to FIG. 9.

The activation sequence of the controller 18 may correspond to a data structure representing the switching frequency and duty cycle of the switching devices 38 connected to each of the columns 70 and rows 72 in connection with the resonant loads 36. For example, the controller 18 may be configured to communicate an activation signal configured to selectively activate each of the column-switching devices 74 and the row-switching device 76 at each time slice $T_s$ over the duration $T_{prog}$ of the activation sequence. The time slice duration $T_s$ may be set equal to one semi-period of a frequency of the mains input voltage 52 or an integer number of semi-periods of the mains input voltage 52.

The activation sequence for the matrix 62 of the induction coils 14 may be computed by the controller 18 with a plurality of constraints. For example, a first constraint may require that every time slice duration $T_s$ for each row-switching device 76 be either idle (OFF) or operating at a common frequency, equal for every resonant load 36 that is active in a particular semi-period of the frequency of the mains input voltage 52, wherein the frequency may vary from one time slice $T_s$ to another. A second constraint applied to the operation of the controller 18 may require that each of the column-switching devices 74 be either idle (OFF) or closed (ON) for every time slice duration $T_s$. A third constraint may require that a Boolean matrix $C_d$ defining the states (OFF/ON) of each inductor 40 in the matrix 62 must have a unitary rank for every time slice duration $T_s$. Finally, a fourth constraint may require that the controller 18 controls the average power to each resonant load 36 averaged over $T_{prog}$ to be equal to a desired setpoint. Thanks to this control method, it is possible to energize in a controlled manner the individual induction coils 14, 40 without incurring in unwanted cross-conduction.

As shown in FIG. 4, the matrix 62 is represented having M rows 72 and N columns 70. The mains input voltage 52 may comprise a 2 phase or 3 phase distribution system. Accordingly, the N columns 70 could be divided into 2 or 3 groups in order to balance the power across the corresponding phases. For example, if N=8, a cooktop 10 is rated for a maximum power of 7200 W at 230V could be split into two sub-matrices of N=4 columns 70 each. Each matrix of the cooktop 10 may then be rated at a total power of 3600 W, wherein each of the two matrices is connected to a different phase of the mains input voltage 52.

The sub-matrices may be fed by one of the voltage rectifiers 50, which may be commonly connected to all of the columns 70 connected to the same phase of the mains input voltage 52. In this configuration, the common voltage rectifier 50 may provide for the voltage across each of the D.C. bus capacitors (e.g. D.C. bus capacitor 56) to be discharged to near zero voltage at every zero crossing of the mains input voltage 52 when power is being delivered to at least one inductor 40 attached to that particular phase/sub-matrix. This operation may result in the beneficial effect of allowing the possibility of the controller 18 to soft-start any of the inverters 64 at the next semi-cycle of the mains input voltage 52 because the voltage of the D.C. bus capacitor 56 is approximately zero at this time.

Figure 6:
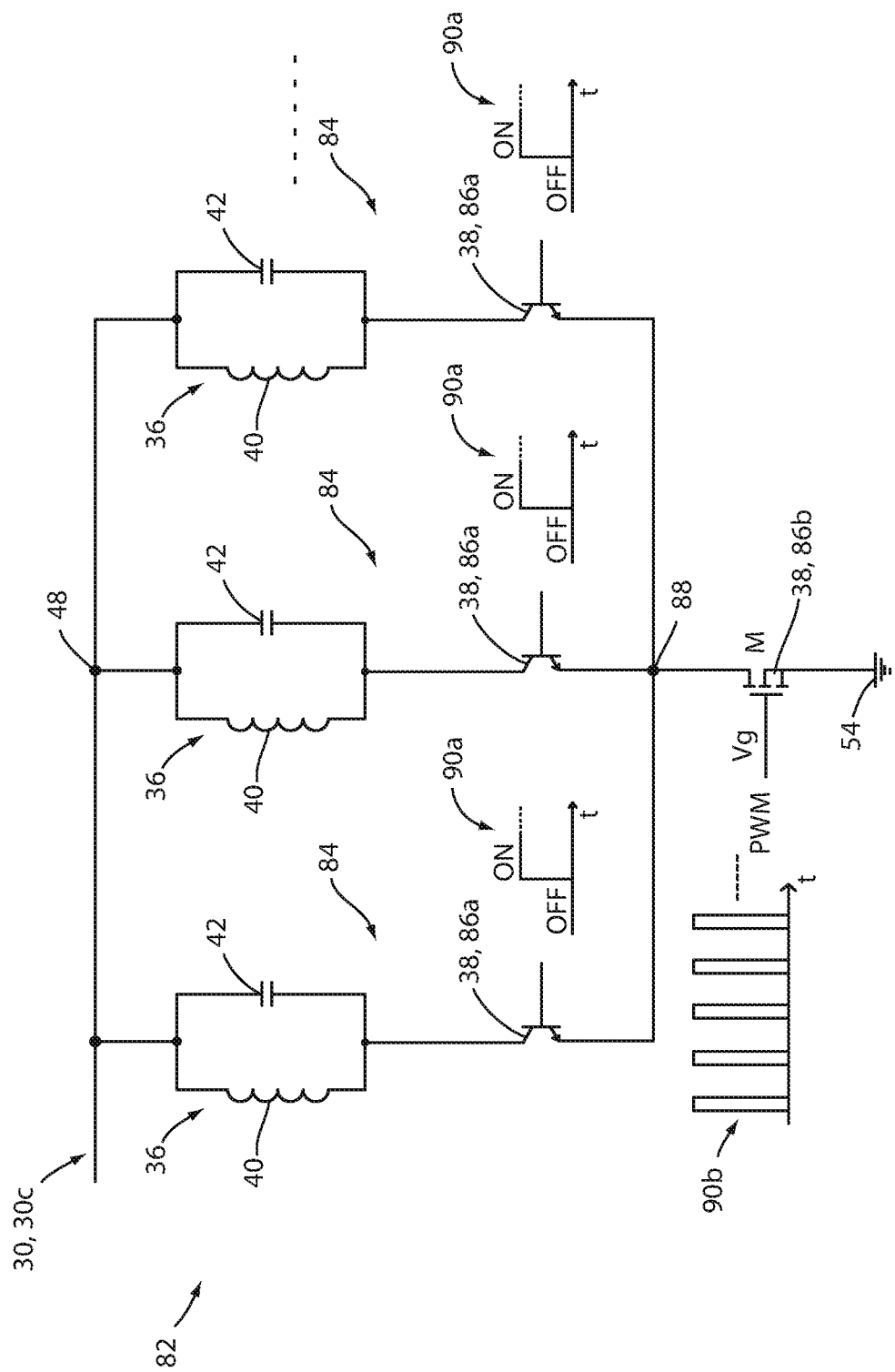
FIG. 6 is a circuit diagram demonstrating a control circuit for an emitter switched array of quasi-resonant inverters comprising switching devices arranged in series.
Figure 7:
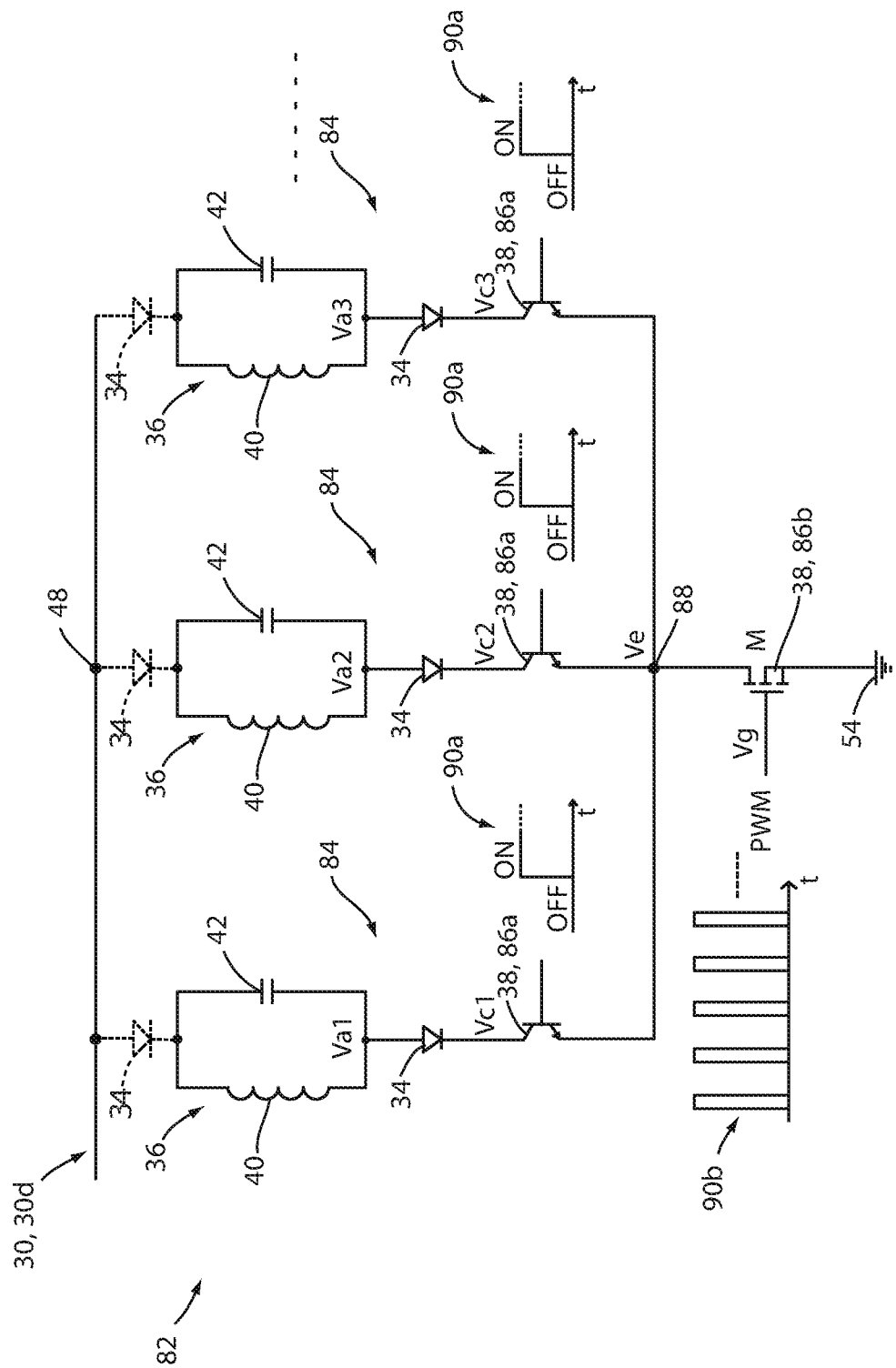
FIG. 7 is a circuit diagram demonstrating a control circuit for an emitter switched array of non-under-clamped quasi-resonant inverters comprising switching devices arranged in series.
Figure 8:
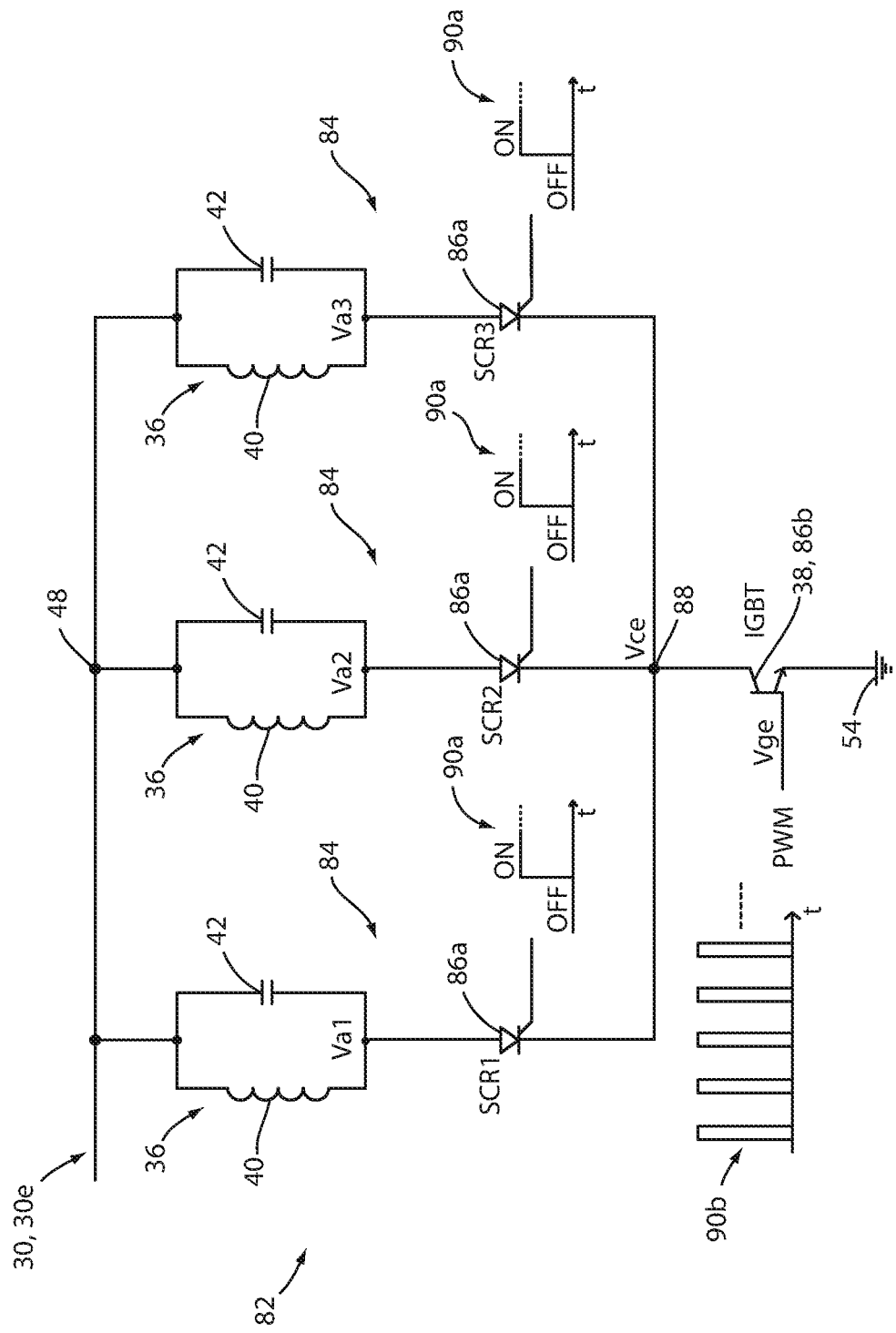
FIG. 8 is a circuit diagram demonstrating a control circuit for an emitter switched array of non-under-clamped quasi-resonant inverters comprising switching devices arranged in series.

Referring now to FIGS. 6-8, circuit diagrams are shown for emitter-switched arrays 82 of the induction coils 14, which are represented by inductors 40 of the resonant loads 36. For clarity, each of the control circuits 30 demonstrated in FIGS. 6, 7, and 8 may be referred to respectively as a third control circuit 30c, a fourth control circuit 30d, and a fifth control circuit 30e. The control circuits 30c, 30d, and 30e may each be configured to control the current supplied to a plurality of inverters 84 comprising the switching devices 38 arranged in series.

Each of the arrays 82 of the inverters 84 shown in FIGS. 6-8 may comprise a plurality of the switching devices 38 connected in series. For clarity, the switching devices 38 may be referred to as a first switching device 86a and a second switching device 86b. The first switching device 86a may be connected in series with each of the resonant loads 36. Additionally, each of the first switching devices 86a may be connected to a common, second switching device 86b. The series connection of the switching devices 86a and 86b may provide for improved switching performance while minimizing cost. Each of the control circuits 30 may be supplied power via the D.C. power supplies 46 comprising the voltage rectifier 50. As previously discussed, the voltage rectifier may be configured to rectify a mains input voltage 52 into direct current and output the D.C. voltage to the D.C. bus 48 and a ground connection 54. Further details of the specific configurations of each of the exemplary embodiments shown in FIGS. 6-8 are provided in the following description. In general, the switching devices 86a, 86b discussed in reference to FIGS. 6-8 may be referred to as the switching devices 86.

Referring now to FIG. 6, the third control circuit 30c may comprise the array 82 of inverters 84 connected in parallel. The resonant loads 36 may comprise the inductor 40 and the capacitor 42 connected in parallel. Each of the resonant loads 36 may be connected to the D.C. bus 48 and further connected in series with one of the first switching devices 86a. The first switching devices 86a are connected to the second switching device 86b via a common node 88. In this configuration, the controller 18 may be configured to drive the resonant loads 36 of the third control circuit 30c synchronously or in a time-multiplexed mode of operation.

In some embodiments, the first switching devices 86a may correspond to high voltage devices with comparatively low switching speeds while the second switching device 86b may correspond to a relatively low voltage, high switching speed device. In this configuration, the third control circuit 30c may provide for a fast switching rate supported by the second switching device 86b while controlling the high voltage of the resonant loads 36 with the first switching devices 86a.

Referring now to FIG. 7, the fourth control circuit 30d is shown. The fourth control circuit 30d may be similar to the third control circuit 30c and may further comprise the rectifying devices 34 arranged in series with the resonant loads 36. As demonstrated in FIG. 7, each of the inverters 84 comprises the rectifying device 34 interposed between the resonant loads 36 and the first switching devices 86a. The rectifying devices 34 may prevent current passing among the first switching devices 86a by blocking return currents in each of the inverters 84. Though demonstrated with the rectifying device 34 located downstream, in some embodiments, the rectifying device 34 may be located upstream of the resonant load 36, between the resonant load 36 and the D.C. bus 48. A representation of the rectifying device 34 positioned upstream of the resonant load 36 is shown in phantom lines.

Referring to FIGS. 6 and 7, the first switching devices 86a may be implemented as current controlled switching devices. Such devices may include but are not limited to: bipolar junction transistors (BJTs), insulated-gate bipolar transistors (IGBTs), or other low output impedance devices. In exemplary embodiments, BJTs may be implemented to limit cost and take advantage of the decreased switching speeds required for operation of the first switching devices 86a. The second switching device 86b may be implemented as a voltage controlled switching device. In an exemplary embodiment, the second switching device 86b may be implemented as a field-effect transistor (FET) or metal oxide semiconductor FET (MOSFET).

In operation, the connection of the first switching devices 86a and the second switching devices 86b may provide for the controller 18 to control the current supplied to the resonant loads 36 via a union of activation of one or more of the first switching devices 86a in combination with the second switching device 86b. In this configuration, only one of each of the series connected pairs of the switching devices 86a, 86b need to operate at the full switching speed desired for operation of each of the resonant loads 36. For example, the first switching devices 86a may be configured to operate at switching speeds significantly less than the second switching device 86b. Such operation is demonstrated by the relative frequency of the first control signals 90a supplied to first switching devices 86a and the second control signals 90b supplied to second switching device 86b. In some embodiments, the controller 18 may control the first switching devices 86a to operate at a switching frequency less than 5 kHz, while the second switching device 86b is controlled to operate at a frequency greater than 5 kHz.

Additionally, the common connection of the first switching devices 86a to the second device 86b may provide for the control circuits 30c, 30d, 30e to supply a common switching signal to the second switching device 86b. The common frequency may be supplied by a pulse width modulator 92 operating at a constant frequency. The pulse width modulator 92 is demonstrated in FIG. 9 and may be implemented as a dedicated circuit that may be controlled by the controller 18. In this configuration, the individual activation of the first switching devices 86a may be actively controlled by the controller 18 at a relatively low speed. This configuration may provide for the controller 18 to have significantly simplified operational and computational processing requirements, which, in turn, limit the cost of the controller 18 and related components of the control circuits 30c, 30d, 30e.

Referring now to FIG. 8, the fifth control circuit 30e is shown. The fifth control circuit 30e may similarly include the first switching devices 86a connected to the common second switching device 86b. However, the fifth control circuit 30e may differ in that the first switching devices 86a may be implemented as silicon controlled rectifiers (SCRs). The SCRs may provide for the beneficial function of limiting current passing among the first switching devices 86a upstream of the second switching device 86b. Accordingly, the fifth control circuit 30e may not require the separate rectifying devices 34 implemented in the fourth control circuit 30d. Additionally, in the fifth control circuit 30e, the second switching device 86b may be implemented as an IGBT rather than a MOSFET due to the high resonance voltage of the inverters 84 passing through the first switching devices 86a.

Figure 9:
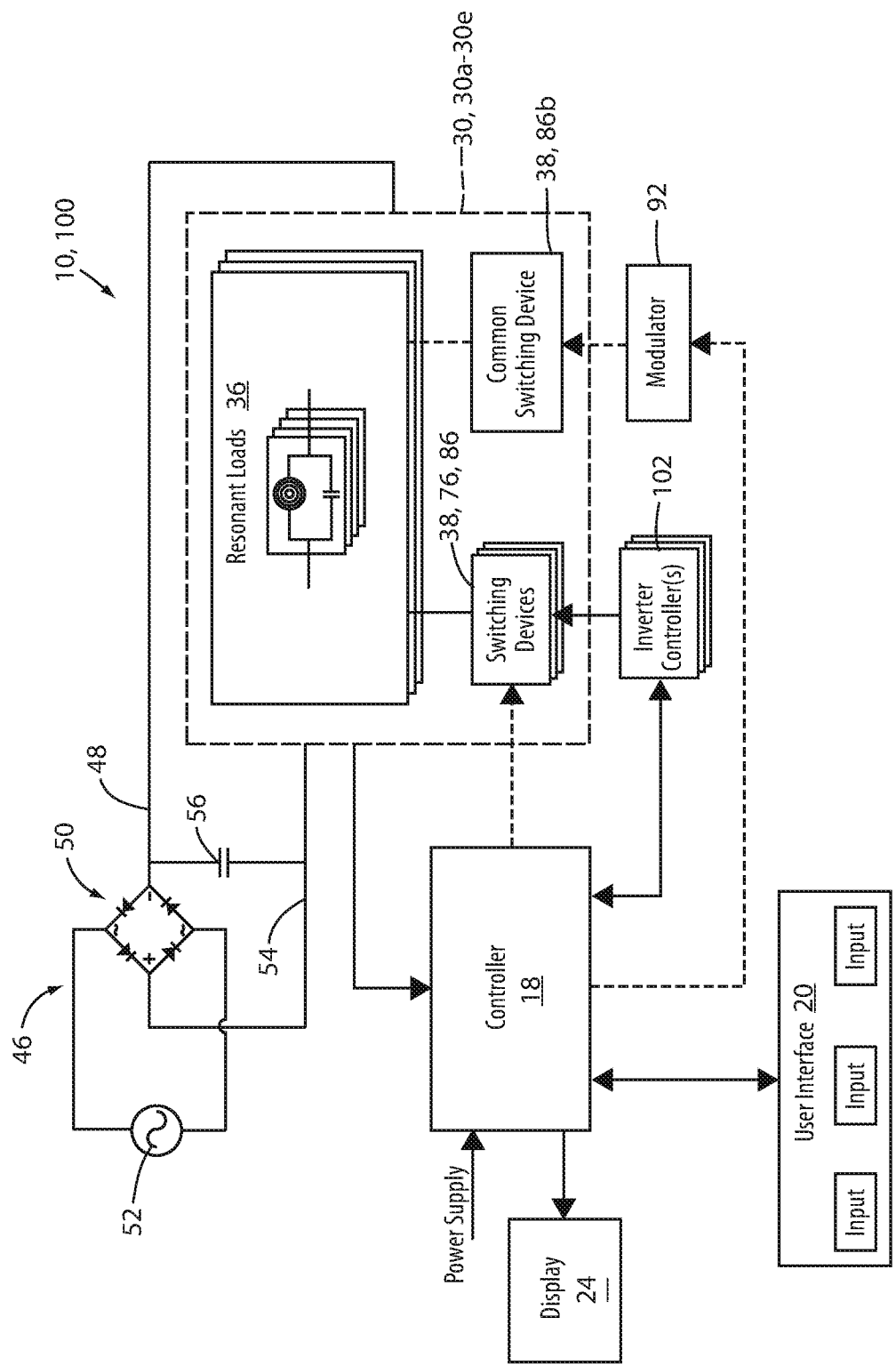
FIG. 9 is a block diagram of an induction system comprising a controller configured to control one or more switching signals configured to control one or more quasi-resonant inverters in accordance with the disclosure.

Referring now to FIG. 9, a block diagram is shown demonstrating induction system 100 comprising the controller 18. The controller 18 may be configured to selectively activate the induction coils 14 represented by the resonant loads 36 in response to an input to the user interface 20. The controller 18 may be implemented as a master controller of a distributed control system. Accordingly, the controller 18 may be configured to control one or more inverter controllers 102, pulse width modulators 92 or various other circuits configured to selectively activate each of the induction coils 14. Accordingly, the controller 18 may be configured to selectively activate one or more cooking regions formed by the induction coils 14 in response to an input or user selection received by the user interface 20.

In general, the controller 18 may be configured to control one or more switching signals supplied to the switching devices 38 as discussed in reference to each of the control circuits 30. The controller 18 may comprise a memory and may be configured to operate one or more control schemes to selectively activate the induction coils 14 of the induction cooktop 10.

The user interface 20 may correspond to a touch interface configured to perform heat control and receive a selection of the induction coils 14 for a cooking operation. The user interface 20 may comprise a plurality of sensors configured to detect a presence of an object (e.g. a finger of an operator) proximate thereto. The sensors of the user interface 20 may correspond to various forms of sensors. For example, the sensors of the user interface 20 may correspond to capacitive, resistive, and/or optical sensors.

In some embodiments, the user interface 20 may further comprise a display 24 configured to communicate at least one function of the cooktop 10. The display 24 may correspond to various forms of displays, for example, a light emitting diode (LED) display, a liquid crystal display (LCD), etc. In some embodiments, the display 24 may correspond to a segmented display configured to depict one or more alpha-numeric characters to communicate a cooking function of the cooktop 10. The display 24 may further be operable to communicate one or more error messages or status messages from the controller 18.

As demonstrated in FIG. 9, the control circuits 30 (e.g. the first control circuit 30a, the second control circuit 30b, etc.) are generally demonstrated in connection with the controller 18. According, the controller 18 may be configured to directly control the switching devices 38 or indirectly control the switching devices 38 in a distributed control configuration via the inverter controllers 102, modulators 92, or other similar control devices. The control circuits 30 are in connection with the D.C. power supply 46. The D.C. power supply 46 may comprise a voltage rectifier 50 configured to rectify a mains input voltage 52 into direct current and output the D.C. voltage to the D.C. bus 48 and a ground connection 54. Additionally, the rectifier 50 may comprise a D.C. bus capacitor 56, which may be configured to smooth the voltage of the D.C. bus 48.

It will be understood by one having ordinary skill in the art that construction of the described device and other components is not limited to any specific material. Other exemplary embodiments of the device disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A control circuit for an induction heating device comprising:
  a D.C. power supply, referenced to a ground connection, configured to supply power to the induction heating device;
  a switching device configured to be selectively activated to control the induction heating device, the switching device being connected on one end to the ground connection;
  a resonant load disposed between the D.C. power supply and the switching device, the resonant load comprising a capacitor and an inductor connected in a parallel configuration; and
  at least one rectifying device disposed in series with the resonant load and the switching device, wherein the switching device is configured to control current from the D.C. power supply through the resonant load.

2. The control circuit according to claim 1, wherein the rectifying device is embodied as a diode.

3. The control circuit according to claim 1, wherein the rectifying device is arranged such that current is conducted directionally from the resonant load to the switching device.

4. The control circuit according to claim 1, wherein the rectifying device is disposed between the resonant load and the switching device.

5. The control circuit according to claim 4, wherein the rectifying device is a diode connected to the resonant load on an anode side and to the switching device on a cathode side.

6. The control circuit according to claim 5, wherein the diode prevents the reverse current passing from the switching device to the resonant load and the power supply in response to a voltage at the anode being less than zero.

7. The control circuit according to claim 1, wherein the rectifying device is disposed between the D.C. power supply and the resonant load.

8. The control circuit according to claim 7, wherein the rectifying device is a diode connected to the D.C. power supply on an anode side and to the resonant load on a cathode side.

9. The control circuit according to claim 8, wherein the diode prevents the reverse current passing from the resonant load to the power supply in response to a voltage at the cathode side being greater than a D.C. power supply voltage.

10. The control circuit according to claim 1, wherein the switching device and the rectifying device are combined forming a reverse-blocking switching device.

11. The control circuit according to claim 10, wherein the reverse-blocking switching device is a reverse-blocking IGBT.

12. The control circuit according to claim 1, wherein the rectifying device is configured to block reverse-current returning through the switching device into the resonant load and the D.C. power supply.

13. A control circuit for an induction heating coil comprising:
  a D.C. power supply, referenced to a ground connection, configured to supply power to the induction heating device;
  a switching device configured to be selectively activated supplying driving current to the induction heating coil, the switching device being connected on one end to the ground connection;
  a resonant load disposed between the D.C. power supply and the switching device, the resonant load comprising a capacitor and the induction heating coil connected in parallel; and
  a rectifying device disposed in series between the D.C. power supply and the switching device.

14. The control circuit according to claim 13, wherein the rectifying device is embodied as a diode positioned either:
  in series between the D.C. power supply and the resonant load; or
  in series between the resonant load and the switching device.

* * * * *